United States Patent [19]

Miller

[11] Patent Number: 4,859,312

[45] Date of Patent: Aug. 22, 1989

[54] PROCESS FOR MAKING MIDDLE DISTILLATES USING A SILICOALUMINOPHOSPHATE MOLECULAR SIEVE

[75] Inventor: Stephen J. Miller, San Francisco, Calif.

[73] Assignee: Chevron Research Company, San Francisco, Calif.

[21] Appl. No.: 2,087

[22] Filed: Jan. 12, 1987

[51] Int. Cl.⁴ ............................ C10G 47/02; C07C 5/13
[52] U.S. Cl. ...................................... 208/111; 585/739; 585/740; 208/114; 208/135; 208/97
[58] Field of Search ................ 208/111, 135, 97, 114; 585/739, 740

[56] References Cited

U.S. PATENT DOCUMENTS

| | | | |
|---|---|---|---|
| 4,440,871 | 4/1984 | Lok et al. | 208/136 |
| 4,482,774 | 11/1984 | Koetsier | 208/120 |
| 4,567,029 | 1/1986 | Wilson et al. | 208/136 |
| 4,664,897 | 5/1987 | Derouane et al. | 502/214 |
| 4,683,050 | 7/1987 | Ward | 208/110 |
| 4,686,029 | 8/1987 | Pellet et al. | 208/110 |
| 4,695,368 | 9/1987 | Ward | 208/111 |

FOREIGN PATENT DOCUMENTS

| | | | |
|---|---|---|---|
| 0124119 | 11/1984 | European Pat. Off. | 208/120 |
| 03694 | 7/1986 | PCT Int'l Appl. | |

Primary Examiner—Patrick P. Garvin
Assistant Examiner—Helane Myers
Attorney, Agent, or Firm—S. R. La Paglia; T. G. De Jonghe; V. J. Cavalieri

[57] ABSTRACT

Using a catalyst comprising a silicoaluminophosphate molecular sieve such as SAPO-11 and SAPO-41, and platinum or palladium, a hydrogenation component, heavy oils are simultaneously subjected to hydrocracking and isomerization reactions. The process selectively produces middle distillates in high yields having good low temperature fluid characteristics, especially reduced pour point and viscosity.

15 Claims, 4 Drawing Sheets

PROCESS FOR MAKING MIDDLE DISTILLATES USING A SILICOALUMINOPHOSPHATE MOLECULAR SIEVE

BACKGROUND OF THE INVENTION

1. Field of the Invention

This invention pertains to a catalytic composition for use in a hydrocracking process to maximize middle distillate yields for hydrocarbons boiling above about 600° F. In particular, this invention concerns a hydrocracking and isomerization process to selectively produce low pour point middle distillate hydrocarbons from a hydrocarbonaceous feed boiling above about 600° F. by contacting the feedstock with a catalyst comprising a specific class of silicoaluminophosphate molecular sieves and a hydrogenation component.

2. Description of the Prior Art

Hydrocracking, used either in a one-step process or in a multistep process coupled with hydrodenitrofication and/or hydrodesulfurization steps, has been used extensively to upgrade poor-quality feeds and to produce middle distillate materials. Over the years, much development work has been done into finding improved cracking conditions and catalysts. Tests have used catalysts containing only amorphous materials and catalysts containing zeolites composited with amorphous materials.

Large pore size zeolites such as zeolites X and Y are presently considered the most active hydrocracking catalysts. However, high activity is not the only essential characteristic of midbarrel cracking in catalysts. Midbarrel selectivity, namely, the percentage of total conversion accounted for by products boiling within the midbarrel range, from about 300° F. to about 725° F., is also important. In fact, as noted in U.S. Pat. No. 3,853,742, Ward, Dec. 10, 1974, many commercial midbarrel hydrocracking processes do not use zeolitic catalysts due to their relatively low midbarrel selectivity.

Also, middle distillates conventionally serve as fuels such as diesel oils, furnace oils, and the like. For convenience, in the handling and in the use of these middle distillates, it is desirable for the pour point to be as low as practical consistent with the temperatures to which they may be exposed. Specifications for these products often include a requirement that the pour point may not exceed a certain maximum value. In some instances it is necessary to subject these distillate fuels to additional processing whose principle purpose is to reduce the pour point of the feed stream. Pour point can also be lowered by lowering the distillate end point, but this reduces yield.

As noted in U.S. Pat. No. 4,486,296, Oleck, Dec. 4, 1984, that while zeolite catalysts have been employed in hydrocracking processes and although they may be effective in providing distillate yields having one or more properties consistent with the intended use of the distillate, these catalysts have come, in general, to suffer the disadvantage of not providing product yields having good low temperature fluidity characteristics, especially reduced pour point and viscosity.

The prior art has utilized a separate dewaxing process in order to reduce the pour point of the middle distillate using such selective intermediate pore size zeolites as ZSM-5 (U.S. Pat. No. RE. 28,398), and ZSM-23 (European Patent Application No. 0092376).

Other methods in the art to produce middle distillates possessing acceptable viscosity and pour point properties include processes wherein the hydrocarbon feeds are concurrently or sequentially subjected to hydrocracking and dewaxing in a continuous process using a large pore size zeolite hydrocarbon cracking catalyst such as zeolite X or zeolite Y and intermediate pore size zeolite dewaxing zeolite catalyst, such as ZSM-5 (U.S. Pat. No. 3,758,402).

These processes have two drawbacks. The first is that while the pour point is reduced, the viscosity is increased, possibly above acceptable limits. Secondly, the process operates by cracking wax primarily to light products (e.g., $C_3$–$C_4$) thereby significantly reducing distillate yield. International Application No. WO86/03694 published July 3, 1986 under the PCT discloses a hydrocracking process to produce high octane gasoline using a catalyst comprising silicoaluminophosphates alone or in combination with traditional hydrocracking catalysts such as zeolite aluminosilicates.

As noted above, the prior art processes for preparing middle distillates in high yields having appropriate viscosity and pour points involve the use of multisteps and/or multicatalysts.

It has now been discovered that middle distillate products can be selectively produced in a simplified process and over a single catalyst, in high yields and having reduced pour points and viscosities as compared to prior art processes.

It has now been found that heavy hydrocarbon oils may be simultaneously hydrocracked and hydrodewaxed to produce a midbarrel liquid product of improved yields and having satisfactory pour point and viscosity. This desirable result is obtained by the use of a catalyst which contains a SAPO-11 or SAPO-41 silicoaluminophosphate molecular sieve component, and which includes a platinum or palladium hydrogenation component to promote isomerization. Other conventional type metals, for example, nickel, tungsten, cobalt, molybdenum or combinations of these metals with platinum or palladium, e.g., Co-Mo, Ni-W, may also be used.

SUMMARY OF THE INVENTION

In accordance with the present invention, there has been discovered a process for selectively producing middle distillate hydrocarbons by hydrocracking and isomerizing a hydrocarbonaceous feed wherein at least 90% of said feed has a boiling point above about 600° F. comprising:

(a) contacting under hydrocracking conditions said hydrocarbonaceous feed with a catalyst comprising a silicoaluminophosphate molecular sieve selected from the group consisting of SAPO-11 and SAPO-41, and at least one hydrogenation component selected from the group consisting of platinum and palladium; and (b) recovering a hydrocarbonaceous effluent. With respect to the effluent, preferably more than about 40% by volume boils above about 300° F. and below about 725° F. and has a pour point below 0° F.

The silicoaluminophosphate molecular sieves used in the process of this invention are described in U.S. Pat. No. 4,440,871, which is incorporated totally herein by reference.

A preferred embodiment is a process using a catalyst comprising SAPO-11 and a platinum or palladium component.

Among other factors, the present invention is based on my discovery that using a silicoaluminophosphate catalyst such as SAPO-11 and SAPO-41, containing a metal such as platinum and/or palladium, in a hydrocracking and isomerization reaction of hydrocarbonaceous feeds boiling above 600° F., results in unexpectedly high yields of middle distillate having excellent pour point characteristics.

In the process of the invention, the hydrocarbon feedstock is heated with the catalyst under conversion conditions which are appropriate for hydrocracking. During the conversion, the aromatics and naphthenes which are present in the feedstock undergo hydrocracking reactions such as dealkylation, ring opening, and cracking, followed by hydrogenation. The long-chain paraffins, which are present in the feedstock, undergo mild cracking reactions to yield non-waxy products of higher molecular weight than compared to products obtained using the prior art dewaxing zeolitic catalysts such as ZSM-5, and at the same time, a measure of isomerization takes place so that not only is the pour point reduced by reason of the cracking reactions described above, but in addition the n-paraffins become isomerized to isoparaffins to form liquid-range materials which contribute to low viscosity, low pour point products.

The process enables heavy feedstocks, such as gas oils, boiling above 600° F. to be more selectively converted to middle distillate range products having improved pour points in contrast to prior processes using large pore catalysts, such as zeolite Y, and the consumption of hydrogen will be reduced even though the product will conform to the desired specifications for pour point and viscosity.

In contrast to dewaxing processes using shape selective catalysts such as zeolite ZSM-5, the yields will be improved and the viscosity kept acceptably low. The latter is ensured by the bulk conversion involving not only the cracking of low viscosity paraffins but high viscosity components (e.g., multi-ring naphthenes) as well. Thus, the present process is capable of effecting a bulk conversion together with a simultaneous dewaxing. It is also possible to operate at partial conversion, thus effecting economies in hydrogen consumption while still meeting pour point and viscosity requirements.

Overall, the process also achieves enhanced selectivity for the production of middle distillate range materials wherein greater than 50% by weight of the converted products boil in the middle distillate range having improved pour points; and the yield of gas and products boiling below the distillate range is reduced.

DETAILED DESCRIPTION

Feedstocks

The feedstock for the process of the invention comprises a heavy hydrocarbon oil such as a gas oil, coker tower bottoms fraction, reduced crude, vacuum tower bottoms, deasphalted vacuum resids, FCC tower bottoms, or cycle oils. Oils derived from coal, shale, or tar sands may also be treated in this way. Oils of this kind generally boil above 600° F. (316° C.) although the process is also useful with oils which have initial boiling points as low as 436° F. (260° C.). Preferably at least 90% of the feed will boil above 600° F. (316° C.) and most preferably at least about 90% of the feed will boil between 700° F. (371° C.) and about 1200° F. (649° C.). These heavy oils comprise high molecular weight long-chain paraffins and high molecular weight ring compounds with a large proportion of fused ring compounds. During the processing, both the fused ring aromatics and naphthenes and paraffinic compounds are cracked by the SAPO-containing catalyst to middle distillate range products. A substantial fraction of the paraffinic components of the initial feedstock also undergo conversion to isoparaffins.

The process is of particular utility with highly paraffinic feeds because, with feeds of this kind, the greatest improvement in pour point may be obtained. However, most feeds will contain a certain content of polycyclic compounds.

As discussed hereinafter, the feedstocks may have been subjected to a hydrofining and/or hydrogenation treatment, which may have been accompanied by some hydrocracking, before being supplied to the present process.

Silicoaluminophosphate Catalysts Compositions (SAPOs)

As mentioned above, the process combines elements of hydrocracking and isomerization. The catalyst used in the process has an acidic component, and a platinum or palladium hydrogenation component. The acidic component comprises a SAPO-11 and SAPO-41 silicoaluminophosphates, which are described in U.S. Pat. No. 4,440,871 and reference is made to this patent for details of these molecular sieves and their preparation, which patent is incorporated totally herein by reference.

The SAPO-11 and SAPO-41 silicoaluminophosphate molecular sieves (SAPOs) suitable for use in the instant process comprise a molecular framework of corner-sharing [SiO$_2$] tetrahedra, [AlO$_2$] tetrahedra and [PO$_2$] tetrahedra, [i.e., (Si$_x$Al$_y$P$_z$)O$_2$ tetrahedral units], and which functions when combined with a platinum or palladium hydrogenation component to convert at effective process conditions the aforementioned feedstock to middle distillate products.

Figure 1:
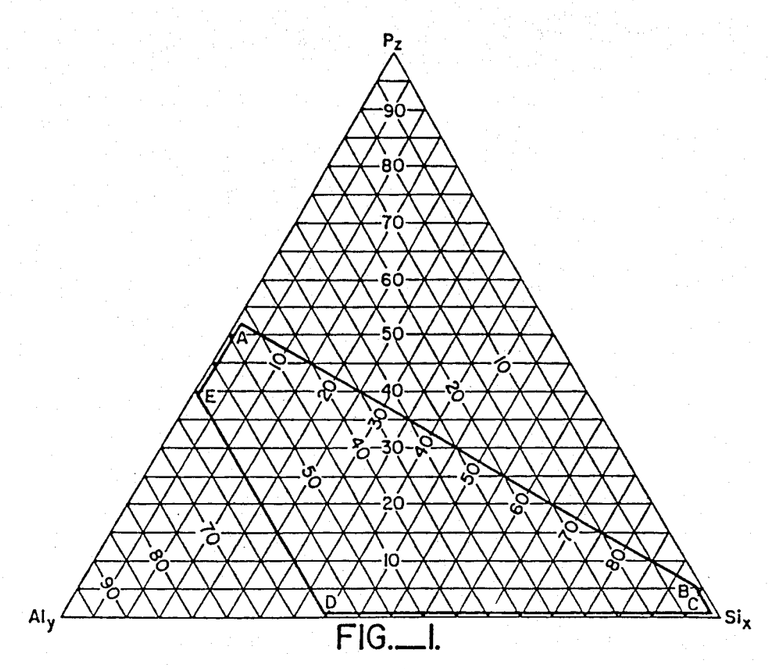
FIG. 1 is a ternary diagram showing the compositional parameters of the silicoaluminophosphates of U.S. Pat. No. 4,440,871 in terms of mole fractions of silicon, aluminum, and phosphorus.
Figure 2:
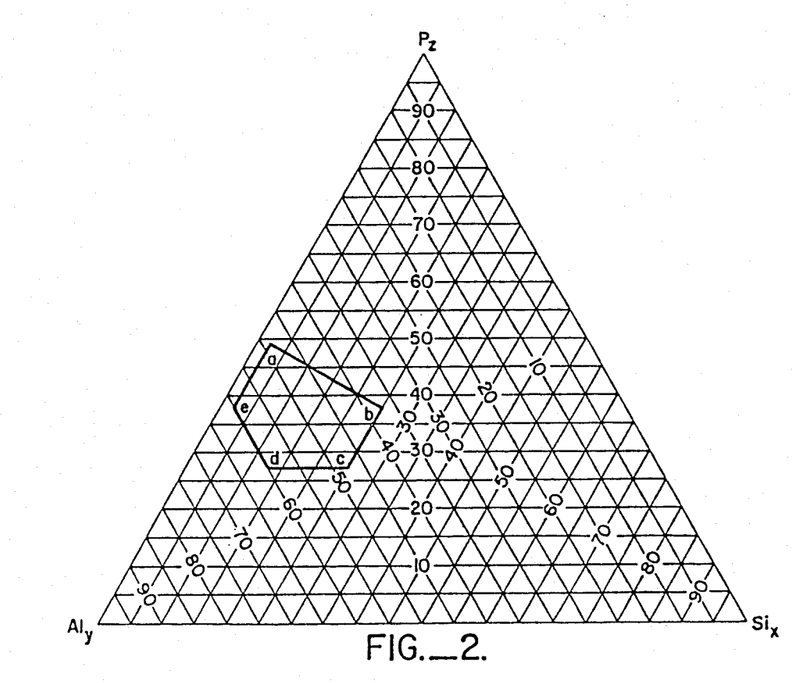
FIG. 2 is a ternary diagram showing the preferred compositional parameters of the silicoaluminophosphates in terms of mole fractions of silicon, aluminum, and phosphorus.

More specifically, SAPO-11, as referred to herein, comprises a silicoaluminophosphate material having a three-dimensional microporous crystal framework structure of [PO$_2$], [AlO$_2$] and [SiO$_2$] tetrahedral units whose unit empirical formula on an anhydrous basis is:

$$mR:(Si_xAl_yP_z)O_2 \qquad (1)$$

wherein "R" represents at least one organic templating agent present in the intracrystalline pore system; "m" represents the moles of "R" present per mole of (Si$_x$-

$Al_yP_z)O_2$ and has a value from zero to about 0.3, "x", "y" and "z" represent respectively, the mole fractions of silicon, aluminum and phosphorus, said mole fractions being within the compositional area bounded by points A, B, C, D and E on the ternary diagram which is FIG. 1 or preferably within the area bounded by points a, b, c, d and e on the ternary diagram which is FIG. 2, and said silicoaluminophosphate having a characteristic X-ray powder diffraction pattern which contains at least the d-spacings (as-synthesized and calcined) set forth below in Table I. When SAPO-11 is in the as-synthesized form "m" preferably has a value of from 0.02 to 0.3.

TABLE I

| 2θ | d | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m–s |

All of the as-synthesized SAPO-11 compositions for which X-ray powder diffraction data have been obtained to date have patterns which are within the generalized pattern of the Table II below.

TABLE II

| 2θ | d | 100 × I/I₀ |
|---|---|---|
| 8.05–8.3 | 10.98–10.65 | 20–42 |
| 9.4–9.65 | 9.41–9.17 | 36–58 |
| 13.1–13.4 | 6.76–6.61 | 12–16 |
| 15.6–15.85 | 5.68–5.59 | 23–38 |
| 16.2–16.4 | 5.47–5.40 | 3–5 |
| 18.95–19.2 | 4.68–4.62 | 5–6 |
| 20.3–20.6 | 4.37–4.31 | 36–49 |
| 21.0–21.3 | 4.23–4.17 | 100 |
| 22.1–22.35 | 4.02–3.99 | 47–59 |
| 22.5–22.9 (doublet) | 3.95–3.92 | 55–60 |
| 23.15–23.35 | 3.84–3.81 | 64–74 |
| 24.5–24.9 (doublet) | 3.63–3.58 | 7–10 |
| 26.4–26.8 (doublet) | 3.38–3.33 | 11–19 |
| 27.2–27.3 | 3.28–3.27 | 0–1 |
| 28.3–28.5 (shoulder) | 3.15–3.13 | 11–17 |
| 28.6–28.85 | 3.121–3.094 | |
| 29.0–29.2 | 3.079–3.058 | 0–3 |
| 29.45–29.65 | 3.033–3.013 | 5–7 |
| 31.45–31.7 | 2.846–2.823 | 7–9 |
| 32.8–33.1 | 2.730–2.706 | 11–14 |
| 34.1–34.4 | 2.629–2.607 | 7–9 |
| 35.7–36.0 | 2.515–2.495 | 0–3 |
| 36.3–36.7 | 2.475–2.449 | 3–4 |
| 37.5–38.0 (doublet) | 2.398–2.368 | 10–13 |
| 39.3–39.55 | 2.292–2.279 | 2–3 |
| 40.3 | 2.238 | 0–2 |
| 42.2–42.4 | 2.141–2.132 | 0–2 |
| 42.8–43.1 | 2.113–2.099 | 3–6 |
| 44.8–45.2 (doublet) | 2.023–2.006 | 3–5 |
| 45.9–46.1 | 1.977–1.969 | 0–2 |
| 46.8–47.1 | 1.941–1.929 | 0–1 |
| 48.7–49.0 | 1.870–1.859 | 2–3 |
| 50.5–50.8 | 1.807–1.797 | 3–4 |
| 54.6–54.8 | 1.681–1.675 | 2–3 |
| 55.4–55.7 | 1.658–1.650 | 0–2 |

SAPO-41, as referred to herein, comprises a silicoaluminophosphate having a three-dimensional microporous crystal framework structure of $[PO_2]$, $[AlO_2]$ and $[SiO_2]$ tetrahedral units, and whose unit empirical formula on an anhydrous basis is the same as Formula (1) for SAPO-11 and is:

$$mR:(Si_xAl_yP_z)O_2 \quad (1)$$

wherein R represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus, said mole fractions being within the compositional area bounded by points A, B, C, D and E on the ternary diagram which is FIG. 1, or preferably within the area bounded by points a, b, c, d and e on the ternary diagram which is FIG. 2, said silicoaluminophosphate having a characteristic X-ray powder diffraction pattern (as-synthesized and calcined) which contains at least the d-spacings set forth below in Table III. When SAPO-41 is in the as-synthesized form "m" preferably has a value of from 0.02 to 0.3.

TABLE III

| 2θ | d | Relative Intensity |
|---|---|---|
| 13.6–13.8 | 6.51–6.42 | w–m |
| 20.5–20.6 | 4.33–4.31 | w–m |
| 21.1–21.3 | 4.21–4.17 | vs |
| 22.1–22.3 | 4.02–3.99 | m–s |
| 22.8–23.0 | 3.90–3.86 | m |
| 23.1–23.4 | 3.82–3.80 | w–m |
| 25.5–25.9 | 3.493–3.44 | w–m |

All of the as-synthesized SAPO-41 compositions for which X-ray powder diffraction data have presently been obtained have patterns which are within the generalized pattern of Table IV below.

TABLE IV

| 2θ | d | 100 × I/I₀ |
|---|---|---|
| 6.7–6.8 | 13.19–12.99 | 15–24 |
| 9.6–9.7 | 9.21–9.11 | 12–25 |
| 13.6–13.8 | 6.51–6.42 | 10–28 |
| 18.2–18.3 | 4.87–4.85 | 8–10 |
| 20.5–20.6 | 4.33–4.31 | 10–32 |
| 21.1–21.3 | 4.21–4.17 | 100 |
| 22.1–22.3 | 4.02–3.99 | 45–82 |
| 22.8–23.0 | 3.90–3.87 | 43–58 |
| 23.1–23.4 | 3.82–3.80 | 20–30 |
| 25.2–25.5 | 3.53–3.49 | 8–20 |
| 25.5–25.9 | 3.493–3.44 | 12–28 |
| 29.3–29.5 | 3.048–3.028 | 17–23 |
| 31.4–31.6 | 2.849–2.831 | 5–10 |
| 33.1–33.3 | 2.706–2.690 | 5–7 |
| 37.6–37.9 | 2.392–2.374 | 10–15 |
| 38.1–38.3 | 2.362–2.350 | 7–10 |
| 39.6–39.8 | 2.276–2.265 | 2–5 |
| 42.8–43.0 | 2.113–2.103 | 5–8 |
| 49.0–49.3 | 1.856–1.848 | 1–8 |
| 51.5 | 1.774 | 0–8 |

The unit empirical formula for a SAPO may be given on an "as-synthesized" basis or may be given after an "as-synthesized" SAPO composition has been subjected to some post treatment process, e.g., calcined. The term "as-synthesized" herein shall be used to refer to the SAPO composition(s) formed as a result of the hydrothermal crystallization but before the SAPO composition has been subjected to post treatment to remove any volatile components present therein. The actual value of "m" for a post-treated SAPO will depend on several factors (including: the particular SAPO, template, severity of the post-treatment in terms of its ability to remove the template from the SAPO, the proposed application of the SAPO composition, and etc.) and the value for "m" can be within the range of values as defined for the as-synthesized SAPO compositions although such is generally less than the as-synthesized SAPO unless such post-treatment process adds template to the SAPO so treated. A SAPO composition which is in the calcined or other post-treated form generally has an empirical formula represented by Formula (1), except that the value of "m" is generally less than about 0.02. Under sufficiently severe post-treatment conditions, e.g., roasting in air at high temperature for long periods (over 1 hr.), the value of "m" may be zero (0) or, in any event, the template, R, is undetectable by normal analytical procedures.

The above silicoaluminophosphates are generally synthesized by hydrothermal crystallization from a reaction mixture comprising reactive sources of silicon, aluminum and phosphorus, and one or more organic templating agents. Optionally, alkali metal(s) may be present in the reaction mixture. The reaction mixture is placed in a sealed pressure vessel, preferably lined with an inert plastic material, such as polytetrafluoroethylene, and heated, preferably under autogenous pressure at a temperature of at least about 100° C., and preferably between 100° C. and 250° C., until crystals of the silicoaluminophosphate product are obtained, usually for a period of from 2 hours to 2 weeks. While not essential to the synthesis of SAPO compositions, it has been found that in general stirring or other moderate agitation of the reaction mixture and/or seeding the reaction mixture with seed crystals of either the SAPO to be produced, or a topologically similar composition, facilitates the crystallization procedure. The product is recovered by any convenient method such as centrifugation or filtration.

After crystallization the SAPO may be isolated and washed with water and dried in air. As a result of the hydrothermal crystallization, the as-synthesized SAPO contains within its intracrystalline pore system at least one form of the template employed in its formation. Generally, the template is a molecular species, but it is possible, steric considerations permitting, that at least some of the template is present as a charge-balancing cation. Generally the template is too large to move freely through the intracrystalline pore system of the formed SAPO and may be removed by a post-treatment process, such as by calcining the SAPO at temperatures of between about 200° C. and to about 700° C. so as to thermally degrade the template or by employing some other post-treatment process for removal of at least part of the template from the SAPO. In some instances the pores of the SAPO are sufficiently large to permit transport of the template, and, accordingly, complete or partial removal thereof can be accomplished by conventional desorption procedures such as carried out in the case of zeolites.

The SAPOs are preferably formed from a reaction mixture having a mole fraction of alkali metal cation which is sufficiently low that it does not interfere with the formation of the SAPO composition. Although the SAPO compositions will form if alkali metal cation are present, such reaction mixtures are not generally preferred. A reaction mixture, expressed in terms of molar oxide ratios, having the following bulk composition is preferred:

$aR_2O:(Si_xAl_yP_z)O_2:bH_2O$ wherein "R" is a template; "a" has a value great enough to constitute an effective concentration of "R" and is within the range of from greater than zero (0) to about 3; "b" has a value of from zero to 500; "x", "y" and "z" represent the mole fractions, respectively of silicon, aluminum and phosphorus wherein x, y and z each have a value of at least 0.01. The reaction mixture is preferably formed by combining at least a portion of the reactive aluminum and phosphorus sources in the substantial absence of the silicon source and thereafter combining the resulting reaction mixture comprising the aluminum and phosphorus sources with the silicon source. When the SAPOs are synthesized by this method the value of "m" in Formula (1) is generally above about 0.02.

Though the presence of alkali metal cations are not preferred, when they are present in the reaction mixture it is preferred to first admix at least a portion of each of the aluminum and phosphorus sources in the substantial absence of the silicon source. This procedure avoids adding the phosphorus source to a highly basic reaction mixture containing the silicon and aluminum source.

The reaction mixture from which these SAPOs are formed contain one or more organic templating agents (templates) which can be most any of those heretofore proposed for use in the synthesis of aluminosilicates. The template preferably contains at least one element of Group VA of the Periodic Table, particularly nitrogen, phosphorus, arsenic and/or antimony, more preferably nitrogen or phosphorus and most preferably nitrogen. The template contains at least one alkyl, aryl, araalkyl, or alkylaryl group. The template preferably contains from 1 to 8 carbon atoms, although more than eight carbon atoms may be present in the template. Nitrogen-containing templates are preferred, including amines and quaternary ammonium compounds, the latter being represented generally by the formula $R'_4N+$ wherein each R' is an alkyl, aryl, alkylaryl, or araalkyl group; wherein R' preferably contains from 1 to 8 carbon atoms or higher when R' is alkyl and greater than 6 carbon atoms when R' is otherwise, as herein before discussed. Polymeric quaternary ammonium salts such as $[(C_{14}H_{32}N_2)(OH)_2]_x$ wherein "x" has a value of at least 2 may also be employed. The mono-, di- and triamines, including mixed amines, may also be employed as templates either alone or in combination with a quaternary ammonium compound or another template.

Representative templates, phosphorus, aluminum and silicon sources as well as detailed process conditions are more fully described in U.S. Pat. No. 4,440,871, which is incorporated totally herein by reference.

When used in the present process, the SAPO-11 and SAPO-41 silicoaluminophosphate molecular sieves are employed in admixture with at least one platinum or palladium hydrogenating component. Non-noble metals, such as tungsten, vanadium, molybdenum, nickel, cobalt, chromium, and manganese, may optionally be added to the catalyst. Combinations of these metals with platinum or palladium, such as cobalt-molybdenum, cobalt-nickel, nickel-tungsten or cobalt-nickel-tungsten, are also useful with many feedstocks. The amount of any one metal ranges from about 0.01% to 10% and preferably 0.1 to 5% by weight of the molecular sieve. The techniques of introducing catalytically active metals to a molecular sieve are disclosed in the literature, and preexisting metal incorporation techniques and treatment of the molecular sieve to form an active catalyst are suitable, e.g., ion exchange, impregnation or by occlusion during sieve preparation. See, for example, U.S. Pat. Nos. 3,236,761; 3,226,339; 3,236,762;

3,620,960; 3,373,109; 4,202,996; and 4,440,871 which patents are incorporated totally herein by reference.

The hydrogenation metal utilized in the process of this invention can mean one or more of the metals in its elemental state or in some form such as the sulfide or oxide and mixtures thereof. As is customary in the art of catalysis, when referring to the active metal or metals it is intended to encompass the existence of such metal in the elementary state or in some form such as the oxide or sulfide as mentioned above, and regardless of the state in which the metallic component actually exists the concentrations are computed as if they existed in the elemental state.

The physical form of the silicoaluminophosphate catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may e employed either as a fluidized catalyst, or in a fixed or moving bed, and in one or more reaction stages.

The SAPO-11 and SAPO-41 molecular sieves may be composited with other materials resistant to the temperatures and other conditions employed in the process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the dewaxing process so that products can be obtained economically without employing other means for controlling the rate of reaction. The silicoaluminophosphate may be incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powder-like materials which cause problems in processing.

Naturally occurring clays which can be composited with the catalyst include the montmorillonite and kaolin families, which families include the subbentonites, and the kaolins commonly known as Dixie, McNamee, Georgia and Florida clays or others in which the main mineral constituent is halloysite, kaolinite, dickite, nacrite, or anauxite. Fibrous clays such as halloysite, sepiolite and attapulgite can also be used as supports. Such clays can be used in the raw state as originally mined or initially subjected to calcination, acid treatment or chemical modification.

In addition to the foregoing materials, the catalysts may be composited with porous inorganic oxide matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-titania, silica-alumina-magnesia and silica-magnesia-zirconia. The matrix can be in the form of a cogel.

In a preferred embodiment, the final catalyst will be a composite and includes the silicoaluminophosphate, a platinum or palladium hydrogenating metal component and the inorganic oxide matrix. The preferred silicoaluminophosphate is SAPO-11, the preferred metal component is platinum, and the preferred support is alumina. A wide variety of procedures can be used to combine the molecular sieve with the refractory oxide. For example, the molecular sieve can be mulled with a hydrogel of the oxide followed by partial drying if required and extruding or pelletizing to form particles of the desired shape. Alternatively, the refractory oxide can be precipitated in the presence of the molecular sieve. This is accomplished by increasing the pH of the solution of a refractory oxide precursor such as sodium aluminate or sodium silicate. The combination can then be partially dried as desired, tableted, pelleted, extruded, or formed by other means and then calcined, e.g., at a temperature above 600° F. (316° C.), usually above 800° F. (427° C.). Processes which produce larger pore size supports are preferred to those producing smaller pore size supports when cogelling.

Process Conditions

Although the catalyst used in this method exhibits excellent stability, activity and midbarrel selectivity, reaction conditions must nevertheless be correlated to provide the desired conversion rates while minimizing conversion to less desired lower-boiling products. The conditions required to meet these objectives will depend on catalyst activity and selectivity and feedstock characteristics such as boiling range, as well as organonitrogen and aromatic content and structure. They will also depend on the most judicious compromise of overall activity, i.e., conversion per pass and selectivity. For example, these systems can be operated at relatively high conversion rates on the order of 70, 80 or even 90% conversion per pass. However, higher conversion rates generally result in lower selectivity. Thus, a compromise must be drawn between conversion and selectivity. The balancing of reaction conditions to achieve the desired objectives is part of the ordinary skill of the art.

Reaction temperatures generally exceed about 500° F. (260° C.) and are usually above about 600° F. (316° C.), preferably between 600° F. (316° C.) and 900° F. (482° C.). Hydrogen addition rates should be at last about 400, and are usually between about 1,000 and about 15,000 standard cubic feet per barrel. Reaction pressures exceed 200 psig (13.7 bar) and are usually within the range of about 500 to about 3000 psig (32.4 to 207 bar). Liquid hourly space velocities are less than about 15, preferably between about 0.2 and about 10.

The overall conversion rate is primarily controlled by reaction temperature and liquid hourly space velocity. However, selectivity is generally inversely proportional to reaction temperature. It is not as severely affected by reduced space velocities at otherwise constant conversion. Conversely, selectivity is usually improved at higher pressures and hydrogen addition rates. Thus, the most desirable conditions for the conversion of a specific feed to a predetermined product can be best obtained by converting the feed at several different temperatures, pressures, space velocities and hydrogen addition rates, correlating the effect of each of these variables and selecting the best compromise of overall conversion and selectivity.

The conditions should be chosen so that the overall conversion rate will correspond to the production of at least about 40%, and preferably at least about 50% of products boiling below about 725° F. (385° C.) per pass and preferably below about 725° F. and above about 300° F. Midbarrel selectivity should be such that at least about 40%, preferably at least about 50% of the product is in the middle distillate range and preferably below about 725° F. and above about 300° F. The process can maintain conversion levels in excess of about 50% per pass at selectivities in excess of 60% to middle distillate products boiling between 300° F. (149° C.) and 725° F. (385° C.). The pour point of the middle distillate effluent obtained by the process will be below about 0° F. and preferably below −20° F.

The process can be operated as a single-stage hydroprocessing zone. It can also be the second stage of a two-stage hydrocracking scheme in which the first stage removes nitrogen and sulfur from the feedstock before contact with the middle distillate-producing catalyst. The catalyst can also be used in the first stage of a multistep hydrocracking scheme. In operation as the first stage, the middle distillate-producing zone also denitrifies and desulfurizes the feedstock; in addition, it allows the second stage using the same catalyst or a conventional hydrocracking catalyst to operate more efficiently so that more middle distillates are produced overall than in other process configurations.

Nitrogen Content of Feedstocks

While the process herein can be practiced with utility when the feed contains organic nitrogen (nitrogencontaining impurities), for example as much as several thousand parts per million by weight of organic nitrogen, it is preferred that the organic nitrogen content of the feed be less than 50, more preferably less than 10 ppmw. Especially good results, in terms of activity and length of catalyst cycle (period between successive regenerations or start-up and first regeneration), are experienced when the feed contains less than 10 ppmw of organic nitrogen. This is surprising in view of the art (see, for example, U.S. Pat. No. 3,894,938).

Sulfur Content of Feedstocks

The presence of organic sulfur (sulfur-containing impurities) in the feedstock does not appear to deleteriously affect the desired hydrocracking of the feed, for example, in terms of activity and catalyst life. In fact, hydrodesulfurizing of the feed of organic sulfur is in large part a significant concurrent reaction. However, the resulting product, in general, will contain at least some thiols and/or thioethers as a result of inter-reaction of hydrogen sulfide and olefinic hydrocarbons in the effluent product stream. Thus, it may be desirable in some instances that the feed prior to use in the process herein be hydrofined or hydrotreated for at least a substantial removal of both organic sulfur- and nitrogen-containing compounds.

Upstream hydrodenitrogenation can be performed in the reactor with the molecular sieve-containing catalyst or preferably in a separate reactor. When a separate hydrodenitrogenation reactor is used, it may be desirable to remove, e.g., flash, light gaseous products such as $NH_3$ upstream of the reactor containing the molecular sieve-containing catalyst. If the hydrotreating is performed in the same reactor, the molecular sieve-containing catalyst is disposed in one or more layers downstream of an active hydrodenitrogenation catalyst. The single reactor should preferably be operated under hydrotreating conditions sufficient to reduce the organic nitrogen of the feed to 10 ppmw or less before the feed encounters the molecular sieve-containing layer. The volume of hydrodenitrogenation catalyst relative to molecular sieve-containing catalyst can vary over a wide range, such as from about 0.1 to 1 to 20 to 1, preferably at least 0.2 to 1 and more preferably at least 0.5 to 1. The ratio depends upon such parameters as: (a) the organic nitrogen content of the feedstock; (b) the hydrodenitrogenation and hydrocracking activities of the upstream hydrotreating catalyst; and (c) the degree of overall hydrocracking desired.

The upstream hydrotreating catalysts can be any of the conventional catalysts having hydrodenitrogenation and hydrocracking activity. See, for example, U.S. Pat. No. 3,401,125 incorporated herein by reference. In general, such hydrotreating catalysts are porous composites or inorganic matrix oxides such as alumina, silica, magnesia, etc., which contain one or more hydrogenation components such as transition elements, particularly elements of Group VIB or Group VIII of the Periodic Table of the Elements. *Handbook of Chemistry and Physics*, 45th Ed., Chemical Rubber Company. The Group VIB and/or Group VIII or other transition elements can be present as metals, oxides, or sulfides. The hydrotreating catalyst can also contain promoters such as phosphorus, titanium and other materials known in the art, present as metals, oxides or sulfides. The upstream hydrotreating catalyst need not contain a silicoaluminophosphate component. Typical upstream hydrogenation catalysts suitable for use herein contain 10 to 30 wt. % amorphous silica, 20 to 40 wt. % amorphous alumina, 15 to 30 wt. % Group VIB metal oxide, such as $WO_3$, 5 to 15 wt. % Group VIII metal oxide, such as NiO and 2 to 15 wt. % of a promoter oxide, such as $TiO_2$. The hydrotreating catalyst should have an average pore size in the range of about 30 to 200 Angstroms and a surface area of at least about 150 square meters per gram.

The improved process of this invention will now be illustrated by examples which are not to be construed as limiting the invention as described in this specification including the attached claims.

EXAMPLES

Example 1

A. Comparative Example

A hydrodenitrified vacuum gas oil (Table V) was hydrocracked over a sulfided cogelled nickel-tungsten-silica-alumina catalyst containing 7.7 wt. % Ni and 19.4 wt. % W. The conditions were a catalyst temperature of 670° F., a reactor pressure of 2200 psig, a liquid hourly space velocity (LHSV) of 1.3, and a once-through hydrogen rate of 8 MSCF/bbl. The conversion below 700° F. was 56 wt. %, where percent conversion is defined as $$\frac{\text{Wt. \% 700° F.+ (feed)} - \text{Wt. \% 700° F.+ (product)}}{\text{Wt. \% 700° F.+ (feed)}} \times 100$$

Figure 3:
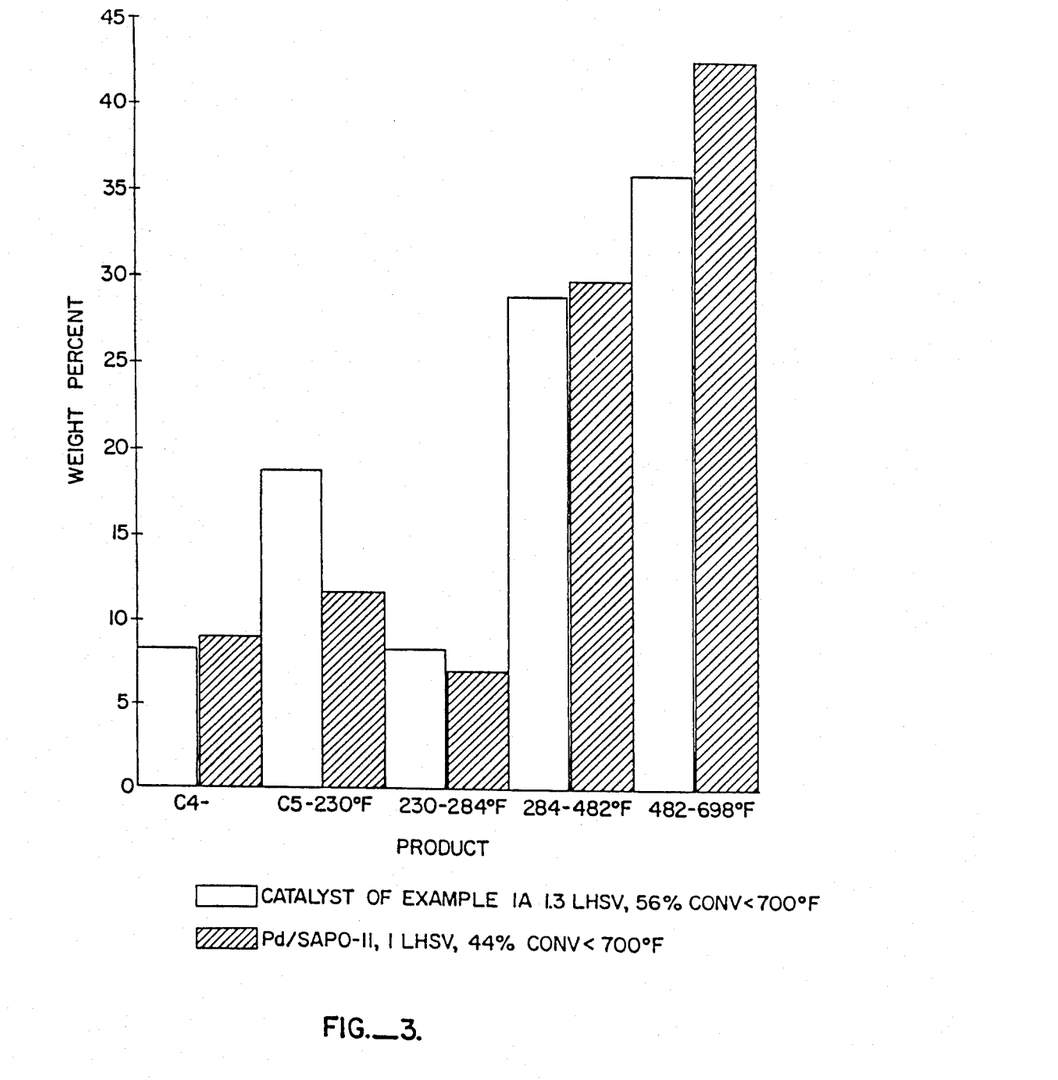
FIG. 3 is a graph showing a comparison for a crystalline silicoaluminophosphate catalyst used in the process of this invention and a sulfided cogelled nickel-tungsten-silica-alumina catalyst with respect to yields.

The liquid product was distilled into fractions boiling in the following ranges: $C_5$–230° F., 230°–284° F., 284°–482° F., 482°–698° F., and 698° F.+. The yields of the 698° F.− fractions are shown in FIG. 3, which shows a diesel (482°–698° F.) yield of 36 wt. %. The inspections of the diesel cut are given in Table VI below, showing a pour point of +5° F.

B. SAPO-11 was prepared as described below and identified as such by X-ray diffraction analysis. More specifically, 115.6 g of 85% H₃PO₄ were added to 59 g of H₂O. To this were slowly added 204.2 g of aluminum isoproxide ([(CH₃)₂CHO]₃Al) and mixed until homogeneous. 8 g of H₂O were added to 60.2 g of Ludox AS-30 (30% silica aqueous sol) and the mixture slowly added to the above with mixing until homogeneous. 45.6 g of di-n-propylamine were then slowly added with mixing, again until homogeneous. Synthesis was carried out in a Teflon bottle in an autoclave at 150° C. for 5 days.

The anhydrous molar composition of the calcined sieve was 0.2SiO₂: Al₂O₃:P₂O₅

The sieve was bound with 35% catapal alumina and made into 1/10-inch extrudate. The extrudate was dried in air for 4 hours at 250° F., then calcined 2 hours at 450° F. and 2 hours at 1000° F. The extrudate was then impregnated by the pore-fill method with 0.5 wt. % Pd using an aqueous solution of Pd(NH₃)₄(NO₃)₂. The catalyst was dried for 2 hours at 250° F., then calcined in air for two hours at 450° F. and two hours at 900° F. It was then crushed to 24–42 mesh and used to hydrocrack the feed of the above example at 750° F., 2200 psig, 1.0 LHSV, and 8M SCF/bbl once-through H₂ to give 44 wt. % conversion below 700° F. Product yields are compared to those for the Comparative Example catalyst in FIG. 3 showing the 482°–698° F. diesel yield to be 7 wt. % higher. The inspections of the diesel cut are given in Table VI below showing a pour point of −40° F.

C. The catalyst of Example B was also run at 750° F., 1.3 LHSV, 2200 psig, and 8M SCF/bbl once-through H₂ to give 47 wt. % conversion below 725° F. The diesel end point was extended from 698° F. to 725° F., thereby increasing diesel yield another 11 wt. %. Despite the higher end point, the pour point was still exceedingly low (−50° F.). The inspections of the diesel cut are given in Table VI below.

TABLE V

| Hydrodenitrified Vacuum Gas Oil Inspections | |
|---|---|
| Gravity, °API | 38.2 |
| Aniline Point, °F. | 246.4 |
| Sulfur, ppm | 1.0 |
| Nitrogen, ppm | 1.8 |
| Pour Point, °F. | +125 |
| Distillation, ASTM D1160, °F. | |
| ST/5 | 688/732 |
| 10/30 | 751/782 |
| 50/70 | 815/856 |
| 90/95 | 928/966 |
| EP | 1024 |

TABLE VI

| | Diesel Cut from Hydrocracking Hydrodenitrified Vacuum Gas Oil | | |
|---|---|---|---|
| Catalyst | Ni—W/SiO₂—Al₂O₃ | Pd/SAPO-11 | Pd/SAPO-11 |
| Conversion, Wt. % | 56 < 700° F. | 44 < 700° F. | 47 < 725° F. |
| Selectivity, Wt. % | 35.8 | 42.5 | 53.4 |
| Selectivity to Total Middle Distillate, Wt. % | 64.7 | 75.4 | 77.3 |
| Pour Point, °F. | +5 | −40 | −50 |
| Cloud Point, °F. | +34 | −20 | −14 |
| Calculated Cetane Index | 81.7 | 78.7 | 78.3 |
| Distillation, D86, LV %, °F. | | | |
| ST/10 | 474/508 | 480/510 | 481/526 |
| 30/50 | 541/576 | 540/572 | 578/623 |
| 70/90 | 612/645 | 604/640 | 647/666 |
| EP | 691 | 690 | 693 |

Example 2 Another batch of SAPO-11 was prepared in Example 1 B above which, after calcination, had the following anhydrous molar composition:

0.4 SiO₂:Al₂O₃:P₂O₅

This was made into an extrudate, impregnated with 0.5 wt. % Pd, and calcined in the same manner as the catalyst of Example 1 B above. The catalyst was then used to hydrocrack the same vacuum gas oil, but at 700° F., 2200 psig, 1.3 LHSV, and 8M SCF/bbl once-through H₂ at a conversion below 725° F. of 60wt. %. Product yields are given in Table VII, showing a somewhat lower diesel yield than at the lower conversion of Example 1 C above. The pour point of the 482°–725° F. diesel was −55° F.

TABLE VII

| Yields from Hydrocracking Hydrodenitrified Vacuum Gas Oil over Pd/SAPO-11 at 700° F., 2200 psig, 1.3 LHSV and 8M SCF/bbl H₂ | |
|---|---|
| Conversion <725° F., Wt. % | 60 |
| Selectivity, Wt. % | |
| C₄— | 10.6 |
| C₅-230° F. | 14.0 |
| 230-284° F. | 6.2 |
| 284-482° F. | 22.4 |
| 482-725° F. | 46.8 |
| Pour Point, °F. | −55 |
| Distillation, D86, LV %, °F. | |
| ST/10 | 467/522 |
| 30/50 | 572/618 |
| 70/90 | 646/673 |
| EP | 712 |

Example 3 SAPO-5 was grown according to U.S. Pat. No. 4,440,871 and identified as such by X-ray diffraction analysis. The anhydrous molar composition of the calcined sieve was 0.1 SiO₂:Al₂O₃:P₂O₅

The sieve was extruded with catapal alumina, impregnated with 0.5 wt. % Pd, and calcined in the same manner as the catalyst of Example 1. This catalyst was then used to hydrocrack the same vacuum gas oil at 1.3 LHSV, 2200 psig, and 8M SCF/bbl once-through H₂.

At 775° F., the conversion below 725° F. was 51 wt. %. The product yields are given in Table VIII. The pour point of the 482°-725° F. diesel cut was +48° F.

TABLE VIII

Diesel Cut from Hydrocracking Hydrodenitrified Vacuum Gas Oil over Pd/SAPO-5 at 51% < 725° F.

| | |
|---|---|
| Selectivity, Wt. % | 47.0 |
| Pour Point, °F. | +48 |
| Cloud Point, °F. | +61 |
| Calculated Cetane Index | 83.1 |
| Distillation, D86, LV %, °F. | |
| ST/10 | 486/523 |
| 30/50 | 570/617 |
| 70/90 | 645/669 |
| EP | 713 |

Example 4

To further show the uniqueness of SAPO-11 in hydrocracking for low pour middle distillate, the following two catalysts were tested for dewaxing a +100° F. pour point lube oil (Table IX) to +30° F. pour point at 1 LHSV, 2200 psig, and 8M SCF/bbl $H_2$.

(a) 0.8 wt. % Pt impregnated on HZSM-5 bound with 35% catapal alumina.

(b) 1.0 wt. % Pt impregnated on SAPO-11 bound with 35% catapal alumina.

Figure 4:
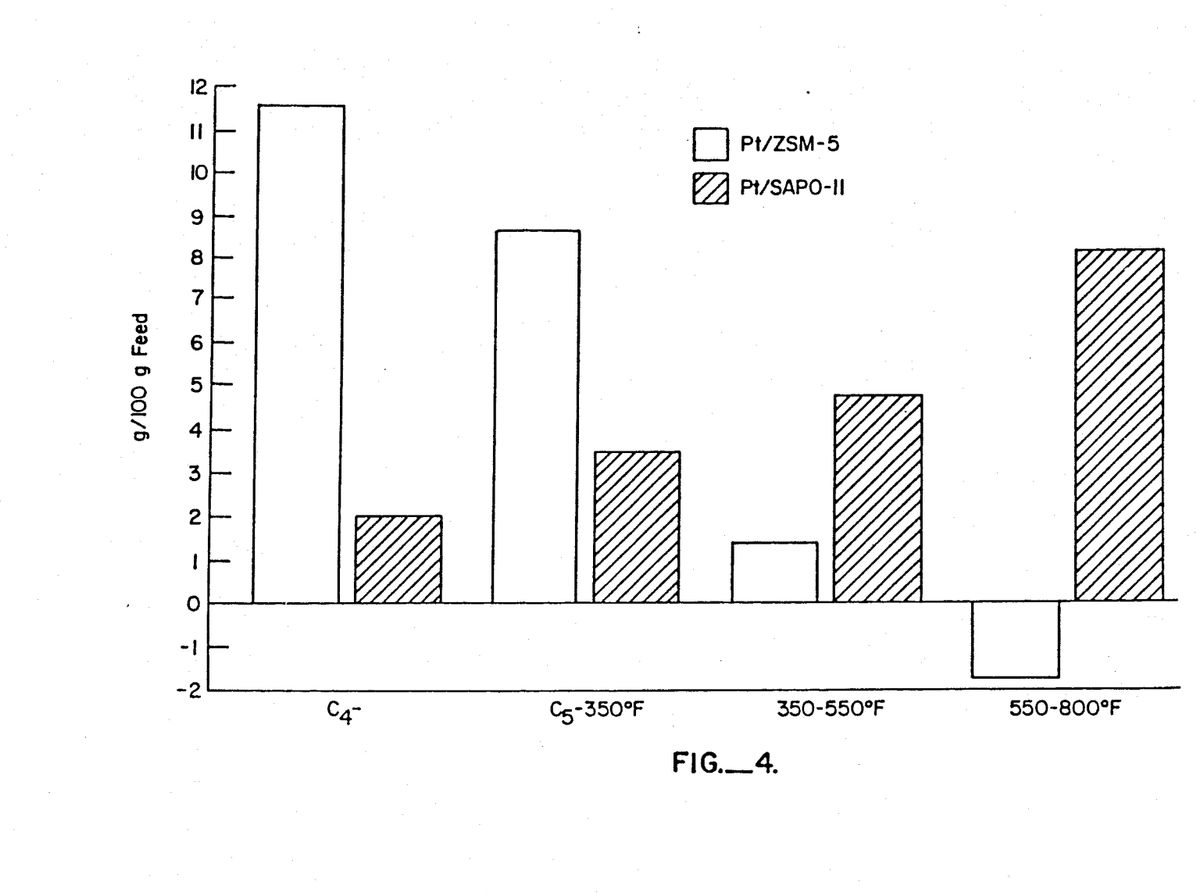
FIG. 4 is a graph showing a comparison for a crystalline silicoaluminophosphate catalyst used in the process of this invention and a ZSM-5 catalyst with respect to yields.

FIG. 4 shows that while the ZSM-5 catalyst dewaxed the feed, it produced essentially no 350°-800° F. liquid, making mostly $C_3$-350° F. The SAPO-11 catalyst, on the other hand, produced mainly liquid boiling in the 350°-800° F. range.

TABLE IX

+100° F. Pour Point Lube Oil

| | |
|---|---|
| Gravity, °API | 34.0 |
| Aniline Point, °F. | 244.0 |
| Sulfur, ppm | 0.4 |
| Nitrogen, ppm | 0.1 |
| Pour Point, °F. | +100 |
| Viscosity, cS, 100° C. | 6.195 |
| Flash Point, °F. | 420 |
| P/N/A/S, LV % | 25.0/62.1/12.8/0 |
| Simulated Distillation, LV %, °F. | |
| ST/5 | 313/770 |
| 10/30 | 794/841 |
| 50 | 873 |
| 70/90 | 908/968 |
| 95/EP | 998/1061 |

What is claimed is:

1. A process for selectively producing middle distillate hydrocarbons by hydrocracking and isomerizing a hydrocarbonaceous feed wherein at least 90% of said feed has a boiling point above about 600° F. comprising:
   a. contacting under hydrocracking conditions wherein the pressure is from about 200 psig to about 3000 psig and a conversion of greater than about 50%, said hydrocarbonaceous feed with a catalyst comprising a silicoaluminophosphate molecular sieve having a three-dimensional microporous crystal framework structure of tetrahedral units whose unit empirical formula on an anhydrous basis is:

$mR:(Si_xAl_yP_z)O_2$ wherein R represents at least one organic templating agent present in the intracrystalline pore system; "m" represents the moles of "R" present per mole of $(Si_xAl_yP_z)O_2$ and has a value from zero to about 0.3, "x", "y" and "z" represent respectively, the mole fractions of silicon, aluminum and phosphorus, said mole fractions being within the compositional area bounded by points A, B, C, D and E on the ternary diagram which is FIG. 1, said silicoaluminophosphate selected from the group consisting of SAPO-11 having an X-ray powder diffraction pattern as set forth in Table I and SAPO-41 having an X-ray powdered diffraction pattern as set forth in Table III and at least one hydrogenation component selected from the group consisting of platinum and palladium;

b. recovering a hydrocarbonaceous effluent wherein more than about 40% by volume of said effluent boils above about 300° F. and below about 725° F. and has a pour point below 0° F.

2. The method of claim 1 wherein the silicoaluminophosphate is SAPO-11.

3. The method of claims 1 and 2 wherein the hydrogenation component is platinum.

4. The method of claims 1 and 2 wherein the hydrogenation component is palladium.

5. The method of claim 1 wherein the hydrogenating component is present in the range of 0.01% to 10% based on the weight of molecular sieve.

6. The process of claim 1 wherein said process is conducted at a temperature of from about 260° C. to 482° C., a pressure of about 200 psig to about 3000 psig, a liquid hourly space velocity of from about 0.1 $hr^{-1}$ to about 20 $hr^{-1}$, and a hydrogen circulation rate of from 400 to 15,000 SCF/bbl.

7. The method of claim 1 wherein said catalyst further comprises an inorganic oxide matrix.

8. The process of claim 7 wherein said matrix is alumina.

9. The process of claim 1 wherein said catalyst further comprises a nickel, cobalt, molybdenum, or tungsten component, or mixtures thereof.

10. The process of claim 1 wherein said feed is a gas oil.

11. A process of claim 1 wherein said feed has a content of nitrogen-containing impurities, calculated as nitrogen, which is below about 10 ppmw.

12. A process as in claim 1 wherein said hydrocarbon feed is selected from the group consisting of petroleum distillates, solvent deasphalted residua, and shale oils.

13. The process of claim 1 wherein greater than 50% by weight of converted product boils above about 300° F. and below 725° F.

14. A process of claim 1 wherein said catalyst is disposed downstream of a reaction zone in which is hydrocarbon feed is contacted under hydroprocessing conditions with an active hydrodenitrogenation catalyst.

15. A process of claim 14 wherein said hydrodenitrogenation catalyst is disposed in a single reactor with said catalyst.

* * * * *